United States Patent [19]

Boston

[11] 4,183,413
[45] Jan. 15, 1980

[54] CULTIVATOR WITH VERTICALLY AND SIDEWARDLY MOVABLE HOES

[76] Inventor: Melvin C. Boston, 5450 Salem-Unity Rd., Salem, Ohio 44460

[21] Appl. No.: 876,000

[22] Filed: Feb. 8, 1978

[51] Int. Cl.² ............................................. A01B 65/02
[52] U.S. Cl. ..................... 172/646; 172/655; 172/656; 172/667
[58] Field of Search ............. 172/5, 6, 233, 234, 172/235, 446, 447, 645, 646, 649, 650, 655, 656, 667, 673, 476, 477

[56] References Cited

U.S. PATENT DOCUMENTS

| | | | |
|---|---|---|---|
| 1,087,991 | 2/1914 | Smith | 172/650 X |
| 1,648,639 | 11/1927 | Court et al. | 172/650 X |
| 2,115,220 | 4/1938 | Stewart et al. | 172/477 X |
| 2,749,824 | 6/1956 | Friday | 172/5 |
| 3,059,704 | 10/1962 | Kasatkin | 172/233 X |

FOREIGN PATENT DOCUMENTS

| | | | |
|---|---|---|---|
| 2637885 | 3/1977 | Fed. Rep. of Germany | 172/655 |
| 1013220 | 4/1952 | France | 172/233 |

*Primary Examiner*—Richard T. Stouffer
*Attorney, Agent, or Firm*—Webster B. Harpman

[57] ABSTRACT

A cultivating machine such as a powered vehicle has several ground engaging hoes and is arranged for moving these hoes relative to a row of plants to be cultivated. The cultivator includes a device for elevating the hoes with respect to the ground and for moving at least two of the hoes in oppositely disposed sideward motion while they are engaged in the ground so as to enable them to cultivate the area between the individual plants in a given row. Pneumatic piston and cylinder assemblies are used impart sideward movement to the sidewardly movable hoes and suitable control valves connect the pneumatic piston and cylinder assemblies with a source of compressed air carried by the vehicle.

3 Claims, 3 Drawing Figures

CULTIVATOR WITH VERTICALLY AND SIDEWARDLY MOVABLE HOES

BACKGROUND OF THE INVENTION (1) Field of the Invention:

This invention relates to cultivators such as those comprising wheeled vehicles and incorporating ground engaging tools or hoes for moving the soil alongside of a row of plants to be cultivated.

(2) Description of the Prior Art:

Prior structures of this type have employed generally fixed hoes or groups of the same which were moved longitudinally of the rows of plants to be cultivated by the vehicle on which they were mounted. Such cultivation as has occured between the plants of individual rows has been done manually and the effort necessary makes such manual cultivation ineffective and time consuming.

This invention comprises sidewardly movable hoes and pneumatic cylinders for moving them between certain predetermined positions so that an operator with a simple control valve can insure the adequate cultivation of the area between the individual plants of a row of plants as well as the area between the respective rows of plants.

SUMMARY OF THE INVENTION

A cultivator with vertically and sidewardly movable hoes is preferably arranged on a wheeled vehicle with a self-powered driving mechanism so that the hoes can be moved along the rows of plants to be cultivated. The cultivator incorporates at least a pair of hoes which are arranged for longitudinal travel and provided with means for elevating the same vertically together with a second pair of hoes which are arranged for longitudinal travel and provided with means for moving them vertically and with auxiliary means for moving them horizontally or from side to side as is necessary to cultivate the areas between the individual plants of an individual row being cultivated.

DESCRIPTION OF THE PREFERRED EMBODIMENT

Figure 1:
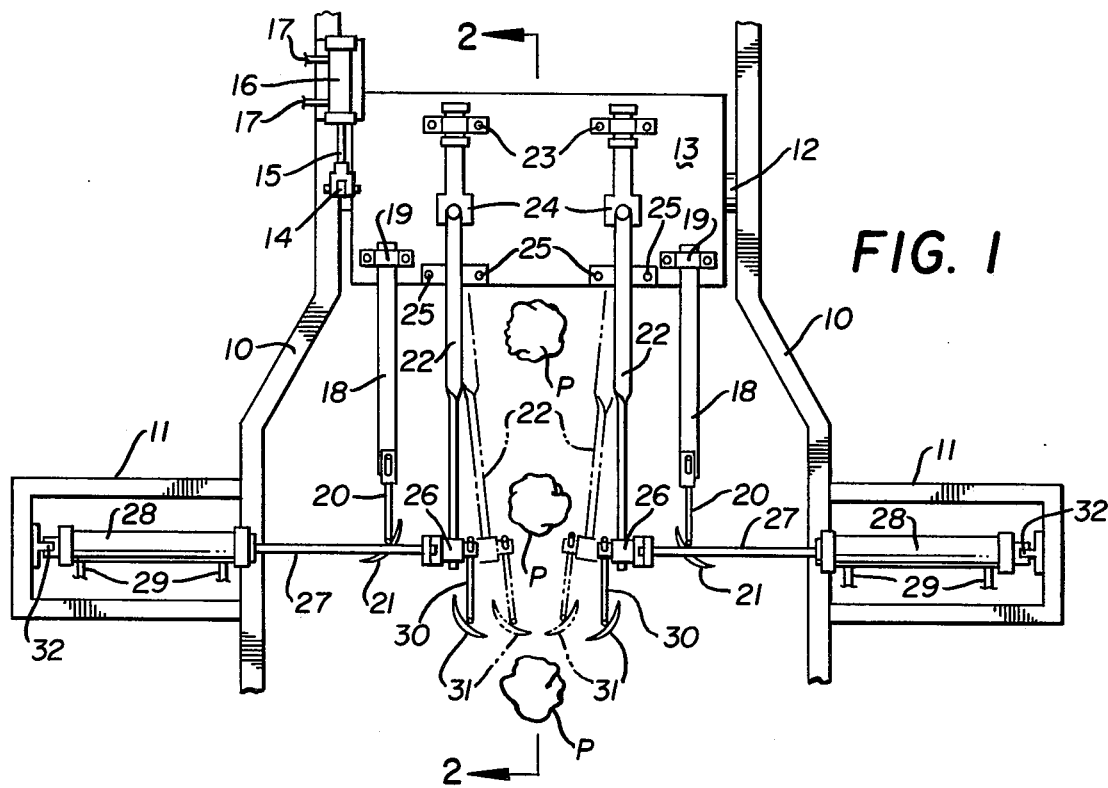
FIG. 1 is a top plan view of a portion of a cultivator such as a vehicle showing an arrangement of sidewardly movable hoes thereon.

In the form of the invention chosen for illustration and description herein, the cultivator with vertically and sidewardly movable hoes may best be seen in FIG. 1 of the drawings and by referring thereto it will be seen that a portion of a frame 10 of a wheeled vehicle has been disclosed, the frame having a pair of outrigger frames 11 on the opposite sides thereof and a pivoted cross frame member 12 forwardly thereof. A rectangular plate-like body member 13 is mounted on the pivoted cross frame member 12 and an arm 14 on the pivoted cross frame member 12 is engaged by a connection on the end of a piston rod 15 of a pneumatic piston and cylinder assembly 16 which is preferably mounted on one portion of the frame 10. Air supply connections 17 communicate with the piston and cylinder assembly 16 and a source of compressed air and include suitable control valves not shown. The arrangement is such that actuation of the pneumatic piston and cylinder assembly 16 will tilt the body member 13 on its transverse axis as defined by the pivoted cross frame member 12.

Still referring to FIG. 1 of the drawings, it will be seen that a pair of horizontally spaced trailing arms 18 are attached at their forward ends to the body member 13 adjacent the near edge thereof by brackets 19 and carry at their rearward or opposite ends substantially vertically positioned extensions 20 the lower ends of which mount ground engaging tools or hoes 21. In FIG. 1 of the drawings, a plurality of plants P are shown in a single row and in spaced relation to one another and those skilled in the art will observe that the spacing of the individual plants may vary from 12 to 36 inches depending upon the particular plants and their growth requirements. It will also be seen that the relatively fixed hoes 21 will cultivate the soil on either side of the row of plants P but will not reach or cultivate the soil between the individual plants P of the row as shown.

The body member 13 has a pair of secondary horizontally spaced trailing arms 22 attached thereto inwardly of the rear edge thereof and spaced inwardly of the trailing arms 18 by secondary brackets 23 and these secondary trailing arms incorporate flexible connections or universal joints 24 overlying the body member 13 so that the majority of the secondary trailing arms 22 can move sidewardly. Stop means 25 is also provided to limit the sideward movement of each of the pair of secondary trailing arms 22. The secondary trailing arms 22 have connecting members 26 adjacent their rearmost ends and the connection members 26 are attached to the ends of piston rods 27 of a pair of oppositely disposed secondary pneumatic piston and cylinder assemblies 28 which are themselves carried on the outrigger frames 11 heretofore described. Air supply connections 29 on each of the secondary pneumatic cylinders 28 communicate with the air source heretofore referred to and suitable control valves not shown are incorporated in the connections.

The connecting members 26 have substantially vertically positioned extensions 30 thereon and ground engaging tools or hoes 31 are affixed to the lower ends of the extensions 30. It will be observed that the positioning of the hoes 31 is such that they are positioned rather closely to the sides of the row of plants P and that by actuation of the pneumatic piston and cylinder assemblies 28 the hoes 31 may be moved toward one another to the positions shown in broken lines in FIG. 1 where the hoes 31 will cultivate the area of the soil between each of the individual plants P of the row being cultivated.

It will be obvious to those skilled in the art and examining the disclosure of FIG. 1 of the drawings, that it will be necessary to move the hoes 31 into and out of the areas between the plants P so that they will avoid engagment with the individual plants P which would otherwise occur. An operator working the control valves heretofore referred to can readily perform this action by manipulation of the control valves so as to alternately extend and retract the piston rods 27 of the secondary pneumatic piston and cylinder assemblies 28. Thus the areas alongside the rows of the plants P is cultivated and at the same time the areas between the individual plants P may be cultivated simultaneously.

Figure 2:
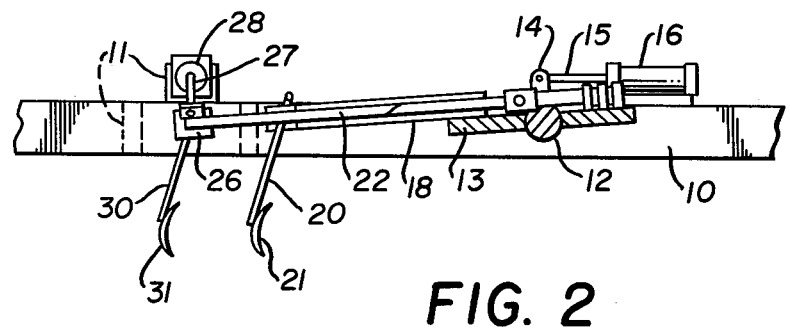
FIG. 2 is a side elevation with parts broken away and parts in cross section as taken on line 2—2 of FIG. 1.

In FIG. 2 of the drawings, the hoes 21 and 31 may be seen in their normal ground engaging position and it will be noted that by actuating the pneumatic piston and cylinder assembly 16 the body member 13 will tilt upon its transverse axis which is the same as the pivotal frame 12 and raise both the hoes 21 and 31 upwardly from the positions shown.

Figure 3:
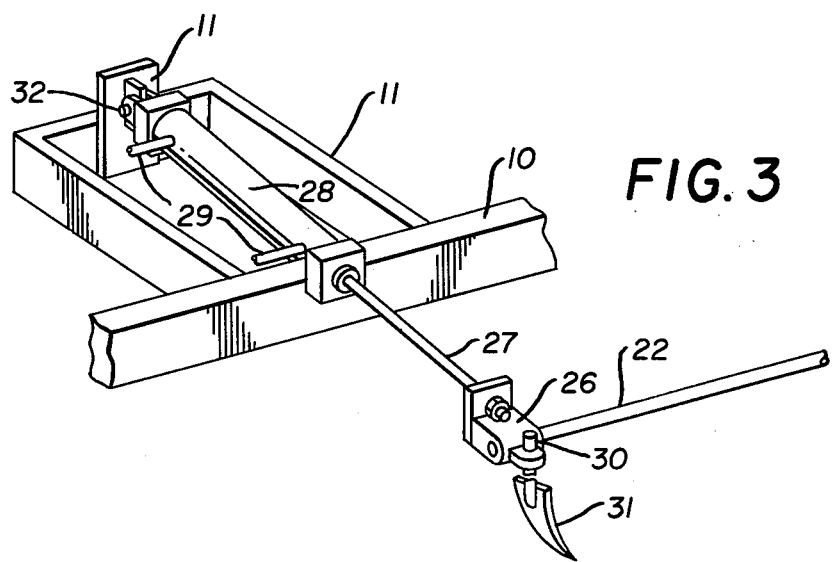
FIG. 3 is a perspective elevation of one of the sidewardly movable hoes seen in FIGS. 1 and 2 of the drawings.

By referring to FIG. 3 of the drawings, an enlarged perspective elevation of a portion of the frames 10 and 11 may be seen and it will be observed that the outer end of the secondary pneumatic piston and cylinder assembly 28 is pivoted to an upward extension of the frame 11 by a pivot member 32, the arrangement being such that as the trailing arms 22 are elevated or lowered by the tilting of the body member 13 as heretofore described the piston and cylinders 28 and their piston rods 27 will move in arcs based on the pivot members 32.

It will thus be seen that a cultivator with vertically and sidewardly movable ground engaging hoes has been disclosed which will enable a complete cultivation of a row of plants by moving the fixed cultivators or hoes 21 alongside the row of plants and simultaneously moving the movable hoes or cultivators 31 into and out of the areas between the individual plants P of the row being cultivated.

Although but one embodiment of the present invention has been illustrated and described, it will be apparent to those skilled in the art that various changes and modifications may be made therein without departing from the spirit of the invention and having thus described my invention what I claim is:

1. In a cultivator having a frame and means for moving it along a row of longitudinally spaced plants to be cultivated; a transversely positioned body member pivoted at its ends to said frame, a pair of trailing arms fixedly mounted on the body member and a pair of secondary trailing arms movably mounted on said body member and interposed completely between and free of said fixed trailing arms so that said secondary trailing arms may be moved inwardly toward each other without interference of said fixed arms, ground engaging hoes on the ends of said fixed and secondary trailing arms whereby said hoes on said secondary trailing arms may be moved between said plants of said row, motion imparting devices on said frame and extending laterally outwardly from the ends of said secondary trailing arms and means connecting said motion imparting devices to said secondary trailing arms, said motion imparting devices comprising means for moving said secondary trailing arms laterally, said devices further permitting said secondary trailinng arms to move vertically.

2. The improvement in a cultivator set forth in claim 1 and wherein the mounting of said secondary trailing arms to said body member is provided by universal joints connected therebetween to further facilitate movement of said secondary trailing arms both laterally and vertically.

3. The improvement in a cultivator set forth in claim 1 and wherein the secondary trailing arms are movably mounted on said body member at a location thereon adjacent the edge thereof opposite the edge of said body member nearest said hoes and means on said frame engaging said body member for tilting said body member on its pivotal axis to impart vertical motion to said secondary trailing arms and the hoes thereon.

* * * * *